(12) United States Patent
Campton

(10) Patent No.: US 11,407,302 B2
(45) Date of Patent: Aug. 9, 2022

(54) TORQUE TRANSFER ASSEMBLY AND VEHICLE INCLUDING THE SAME

(71) Applicant: BorgWarner Inc., Auburn Hills, MI (US)

(72) Inventor: Calahan Campton, Royal Oak, MI (US)

(73) Assignee: BorgWarner Inc., Auburn Hills, MI (US)

(*) Notice: Subject to any disclaimer, the term of this patent is extended or adjusted under 35 U.S.C. 154(b) by 268 days.

(21) Appl. No.: 16/802,163

(22) Filed: Feb. 26, 2020

(65) Prior Publication Data

US 2021/0260984 A1    Aug. 26, 2021

(51) Int. Cl.
*B60K 6/24* (2007.10)
*B60K 6/26* (2007.10)
(Continued)

(52) U.S. Cl.
CPC ............... *B60K 6/442* (2013.01); *B60K 6/24* (2013.01); *B60K 6/26* (2013.01); *B60K 6/36* (2013.01);
(Continued)

(58) Field of Classification Search
CPC . B60K 6/442; B60K 6/24; B60K 6/26; B60K 6/36; B60K 6/383; F02N 11/04; F16H 7/02; B60Y 2200/92
See application file for complete search history.

(56) References Cited

U.S. PATENT DOCUMENTS

| 5,704,440 A | * | 1/1998 | Urban | B60K 6/442 |
| | | | | 180/65.23 |
| 6,184,603 B1 | * | 2/2001 | Hamai | B60W 20/00 |
| | | | | 903/952 |

(Continued)

FOREIGN PATENT DOCUMENTS

| DE | 102018208154 B3 | 5/2019 |
| WO | 2016001534 A1 | 1/2016 |

(Continued)

OTHER PUBLICATIONS

Machine-Assisted English language abstract and Machine-Assisted English language translation for DE 10 2018 208 154 extracted from espacenet.com database on Mar. 19, 2020, 10 pages.
(Continued)

*Primary Examiner* — John D Walters
(74) *Attorney, Agent, or Firm* — Howard & Howard Attorneys PLLC

(57) ABSTRACT

A torque transfer assembly includes an engine starter, an electric machine, a torque converter, and a disconnect clutch further defined as a mechanical clutch. The vehicle includes an internal combustion engine including an output shaft, and a transmission. The engine starter is adapted to be rotatably coupled to the output shaft for rotating the output shaft to start the internal combustion engine. The electric machine is adapted to be rotatably coupled to the transmission for delivering rotational torque to the transmission. The torque converter is rotatably coupled to the electric machine and adapted to be rotatably coupled to the transmission. The mechanical clutch is adapted to be rotatably coupled to the output shaft and the torque converter. The mechanical clutch is adapted to selectively rotatably couple the output shaft to the torque converter and is adapted to selectively rotatably decouple the output shaft from the torque converter.

18 Claims, 5 Drawing Sheets

(51) Int. Cl.
*B60K 6/36* (2007.10)
*F02N 11/04* (2006.01)
*B60K 6/442* (2007.10)
*B60K 6/383* (2007.10)
*F16H 7/02* (2006.01)

(52) U.S. Cl.
CPC .............. *B60K 6/383* (2013.01); *F02N 11/04* (2013.01); *F16H 7/02* (2013.01); *B60Y 2200/92* (2013.01)

(56) References Cited

U.S. PATENT DOCUMENTS

| | | | |
|---|---|---|---|
| 6,346,062 B1 * | 2/2002 | Shimabukuro | B60K 6/543 |
| | | | 475/5 |
| 6,616,569 B2 | 9/2003 | Hoang et al. | |
| 7,810,403 B2 * | 10/2010 | Cali | F02N 15/04 |
| | | | 123/179.25 |
| 8,496,561 B2 | 7/2013 | Bucknor et al. | |
| 8,540,602 B2 * | 9/2013 | Ishikawa | B60W 10/08 |
| | | | 180/65.265 |
| 9,086,126 B2 | 7/2015 | Frait et al. | |
| 9,481,234 B2 | 11/2016 | Ideshio et al. | |
| 9,656,665 B2 | 5/2017 | Pietron et al. | |
| 9,676,267 B2 * | 6/2017 | Hirose | B60K 6/543 |
| 9,709,147 B2 | 7/2017 | Steinberger et al. | |
| 9,726,236 B2 | 8/2017 | Papania | |
| 9,828,924 B1 * | 11/2017 | Connolly | F02D 41/062 |
| 10,017,044 B2 * | 7/2018 | Lahr | B60K 6/50 |
| 10,106,148 B2 | 10/2018 | Meyer et al. | |
| 10,166,975 B2 | 1/2019 | Lahr et al. | |
| 10,710,589 B2 * | 7/2020 | Tashiro | B60W 10/02 |
| 2018/0073568 A1 | 3/2018 | Peglowski | |
| 2019/0031180 A1 | 1/2019 | Lee et al. | |
| 2019/0084400 A1 | 3/2019 | Steinberger et al. | |
| 2019/0084401 A1 | 3/2019 | Moasherziad et al. | |
| 2019/0084402 A1 | 3/2019 | Payne et al. | |
| 2019/0128394 A1 | 5/2019 | Satyaseelan et al. | |
| 2019/0131850 A1 | 5/2019 | Heeke | |

FOREIGN PATENT DOCUMENTS

| | | |
|---|---|---|
| WO | 2018111957 A1 | 6/2018 |
| WO | 2019032352 A1 | 2/2019 |

OTHER PUBLICATIONS

English language abstract and machine-assisted English translation for WO 2016/001534 extracted from espacenet.com database on Mar. 19, 2020, 13 pages.

* cited by examiner

TORQUE TRANSFER ASSEMBLY AND VEHICLE INCLUDING THE SAME

BACKGROUND OF THE INVENTION

1. Field of the Invention

The present invention generally relates to a torque transfer assembly and, more specifically, to a vehicle including the torque transfer assembly.

2. Description of the Related Art

Conventional vehicles in the art typically include an internal combustion engine and a transmission for delivering rotational power to wheels of the vehicle. In recent years, there has been a desire to improve fuel efficiency of vehicles.

To accomplish this, some vehicles in recent years include an electric motor that is also able to deliver rotational power to the wheels of the vehicle. Such a vehicle is generally referred to as a hybrid vehicle. Although hybrid vehicles often have improved fuel efficiency when compared to conventional vehicles, hybrid vehicles typically cost more money, require increased engineering design cost, and increase weight when compared to traditional vehicles.

In traditional hybrid vehicles, a disconnect clutch is used to selectively rotatably couple the internal combustion engine to the transmission. However, such traditional hybrid vehicles typically use a friction clutch as the disconnect clutch. While friction clutches offer some advantages as a disconnect clutch, such friction clutches offer several disadvantages. For example, when using a friction clutch as the disconnect clutch, the friction clutch is susceptible to thermal abuse when used as a launching element. Additionally, when using a friction clutch as the disconnect clutch, the friction clutch occupies a large area between the electric machine and the transmission, which can lead to packaging constraints. Furthermore, when using a friction clutch as the disconnect clutch, various control strategies using hydraulic systems are used, which can further increase the complexity of the disconnect clutch's integration with the electric machine and transmission.

As such, there remains a need to provide an improved torque transfer assembly for a vehicle.

SUMMARY OF THE INVENTION AND ADVANTAGES

A torque transfer assembly for use in a vehicle includes an engine starter, an electric machine, a torque converter, and a disconnect clutch further defined as a mechanical clutch. The vehicle includes an internal combustion engine including an output shaft, and a transmission adapted to be rotatably coupled to the output shaft for transmitting rotational torque via the torque transfer assembly. The engine starter of the torque transfer assembly is adapted to be rotatably coupled to the output shaft for rotating the output shaft to start the internal combustion engine. The electric machine of the torque transfer assembly is adapted to be rotatably coupled to the electric machine and the transmission for delivering rotational torque to the transmission. The torque converter of the torque transfer assembly is adapted to be rotatably coupled to the transmission. The mechanical clutch of the torque transfer assembly is adapted to be rotatably coupled to the output shaft and the torque converter. The mechanical clutch is adapted to selectively rotatably couple the output shaft to the torque converter for delivering rotational torque from the output shaft to the transmission through the torque converter and is adapted to selectively rotatably decouple the output shaft from the torque converter for allowing the electric machine to deliver rotational torque to the transmission through the torque converter.

Accordingly, the torque transfer assembly including the engine starter, electric machine, torque converter, and mechanical clutch offers several advantages. First, the torque transfer assembly allows the torque converter to be used as the launching element, which allows the vehicle to achieve torque multiplication when towing. Second, controlling the torque transferred through the torque converter allows for simpler control strategies when compared to conventional torque transfer assemblies. Third, the torque converter is more robust to thermal abuse when used as the launching element when compared to a traditional launch clutch. Fourth, due to the large packaging of the torque converter when compared to a traditional launch clutch, using the mechanical clutch, rather than a friction clutch, results in a smaller amount of space occupied by the torque converter and the mechanical clutch when compared to a torque converter and a friction clutch.

In another embodiment, the torque transfer assembly for use in the vehicle includes a permanently engaged starter, an electric machine, a torque converter, and a disconnect clutch further defined as a friction clutch. The vehicle includes an internal combustion engine including an output shaft, and a transmission adapted to be rotatably coupled to the output shaft for transmitting rotational torque via the torque transfer assembly. The permanently engaged starter is adapted to be rotatably coupled to the output shaft for rotating the output shaft to start the internal combustion engine. The electric machine is rotatably coupled to the torque converter and adapted to be rotatably coupled to the transmission for delivering rotational torque to the transmission. The torque converter is adapted to be rotatably coupled to the transmission. The friction clutch is adapted to be rotatably coupled to the output shaft and the torque converter. The friction clutch is adapted to selectively rotatably couple the output shaft to the torque converter for delivering rotational torque from the output shaft to the transmission through the torque converter, and the friction clutch is adapted to selectively rotatably decouple the output shaft from the torque converter for allowing the electric machine to deliver rotational torque to the transmission through the torque converter.

Accordingly, the torque transfer assembly including the permanently engaged starter, the electric machine, the torque converter, and the friction clutch offers several advantages. First, the torque transfer assembly allows the torque converter to be used as the launching element, which allows the vehicle to achieve torque multiplication when towing. Second, controlling the torque transferred through the torque converter allows for simpler control strategies when compared to conventional torque transfer assemblies. Third, the torque converter is more robust to thermal abuse when used as the launching element when compared to a traditional launch clutch.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
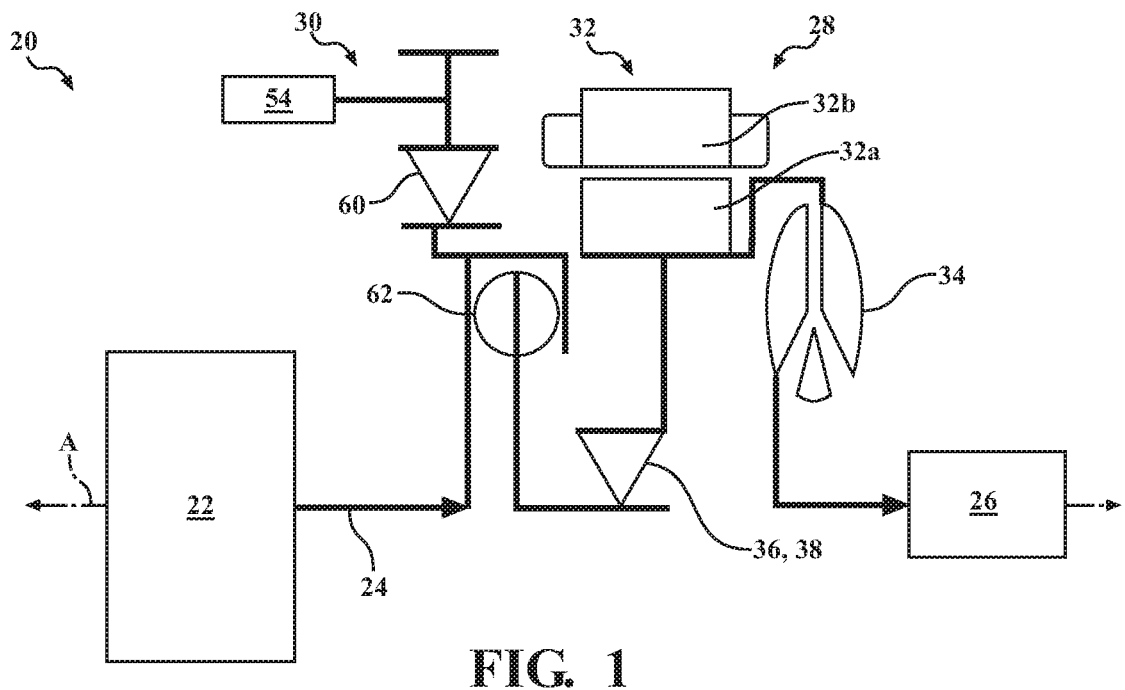
FIG. 1 is a schematic illustration of a vehicle including a torque transfer assembly, with the torque transfer assembly including an engine starter, an electric machine, a torque converter, and a disconnect clutch further defined as a mechanical clutch.

With reference to the Figures, wherein like numerals indicate like parts throughout the several views, a vehicle 20 is schematically shown in FIG. 1. The vehicle 20 includes an internal combustion engine 22 including an output shaft 24, such as a crankshaft. The vehicle 20 also includes a transmission 26 rotatably coupled to the output shaft 24 of the internal combustion engine 22 for transmitting rotational torque. The vehicle 20 also includes a torque transfer assembly 28.

The torque transfer assembly 28 includes an engine starter 30 rotatably coupled to the output shaft 24 for rotating the output shaft 24 to start the internal combustion engine 22. Typically, the engine starter 30 includes a starter motor 54 for providing electrical energy to be converted into mechanical energy for starting the internal combustion engine 22. The torque transfer assembly 28 also includes an electric machine 32 rotatably coupled to the transmission 26 for delivering rotational torque to the transmission 26. The torque transfer assembly 28 further includes a torque converter 34 rotatably coupled to the electric machine 32 and the transmission 26 for transferring rotational torque from at least one of the output shaft 24 to the transmission 26, the output shaft 24 and the electric machine 32 to the transmission 26, and the electric machine 32 to the transmission 26.

The torque transfer assembly 28 additionally includes a disconnect clutch 36 further defined as mechanical clutch 38 rotatably coupled to the output shaft 24 and the torque converter 34. The mechanical clutch 38 is adapted to selectively rotatably couple the output shaft 24 to the torque converter 34 for delivering rotational torque from the output shaft 24 to the transmission 26 through the torque converter 34. When the mechanical clutch 38 is rotatably coupled to the output shaft 24, the mechanical clutch 38 is in an engaged state such that the internal combustion engine 22 can deliver rotational torque to the transmission 26 through the mechanical clutch 38. The mechanical clutch 38 is adapted to selectively rotatably decouple the output shaft 24 from the torque converter 34 for allowing the electric machine 32 to deliver rotational torque to the transmission 26 through the torque converter 34. When the mechanical clutch 38 is rotatably decoupled from the output shaft 24, the mechanical clutch 38 is in a disengaged state such that the internal combustion engine 22 cannot deliver rotational torque to the transmission 26 through the mechanical clutch 38. Typically, the location of the mechanical clutch 38 is the same as traditional disconnect clutches in hybrid systems (i.e., between the internal combustion engine 22 and the transmission 26).

The torque transfer assembly 28 including the engine starter 30, electric machine 32, torque converter 34, and the disconnect clutch 36 further defined as the mechanical clutch 38 offers several advantages. First, the torque transfer assembly 28 allows the torque converter 34 to be used as a launching element, which allows the vehicle 20 to achieve torque multiplication when towing. Second, controlling the torque transferred through the torque converter 34 allows for simpler control strategies when compared to conventional torque transfer assemblies. For example, instead of utilizing a friction clutch for the disconnect clutch 36, which often results in more complex hydraulic control strategies, the combination of the mechanical clutch 38 and torque converter 34 reduces the need for complex hydraulic control strategies. Third, the torque converter 34 is more robust to thermal abuse when used as the launching element when compared to a traditional launch clutch, such as a friction clutch as the disconnect clutch, which can overheat from repeated and frequent use. Fourth, due to the large packaging of the torque converter 34 when compared to a traditional launch clutch, using the mechanical clutch 38, rather than a friction clutch, results in a smaller amount of space occupied by the torque converter 34 and the mechanical clutch 38 when compared to a friction clutch and torque converter. By way of example, using the mechanical clutch 38 with the torque converter 34 can reduce packaging space up to 75% when compared to using a friction clutch and a torque converter. In other words, the mechanical clutch 38 may be four times smaller than a traditional friction clutch.

The electric machine 32 typically includes a rotor 32a and a stator 32b. The electric machine 32 may be configured as an electric motor for delivering rotational torque by converting electrical energy to mechanical energy. The electric machine 32 may also be configured as a generator for receiving rotational torque by converting mechanical energy into electrical energy.

The mechanical clutch 38 may be further defined as at least one of a one-way clutch 40, a selectable one-way clutch 42, and a dog clutch 46.

Figure 2:
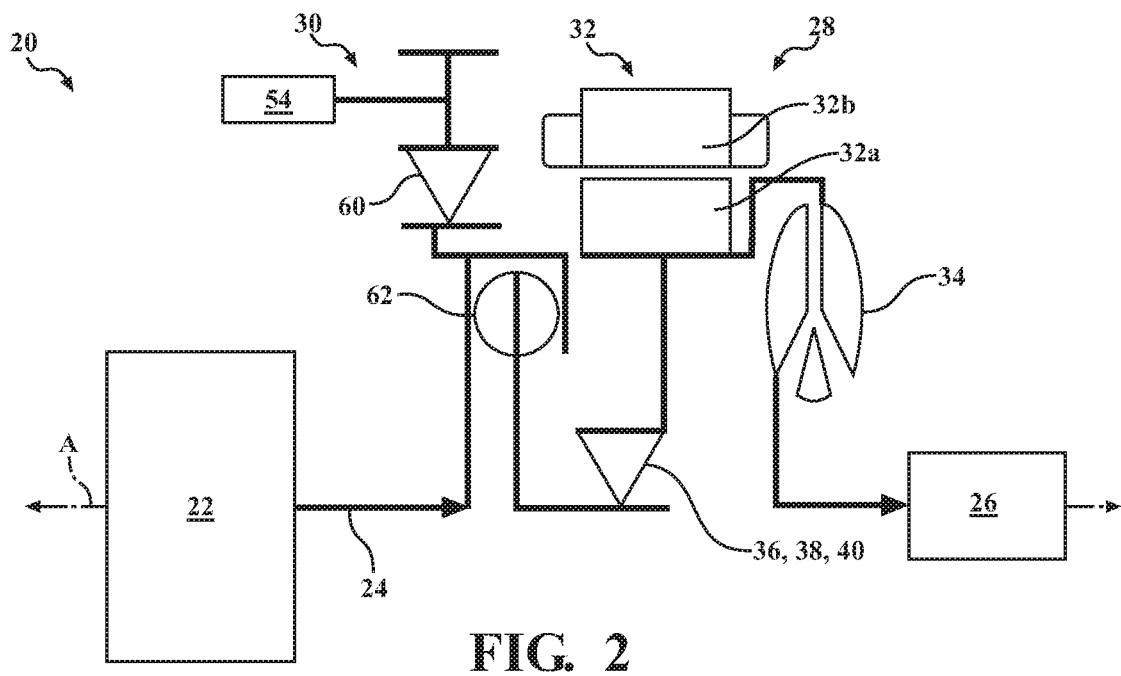
FIG. 2 is a schematic illustration of the torque transfer assembly of the vehicle, with the mechanical clutch being further defined as a one-way clutch, and with the engine starter being further defined as a permanently engaged starter.

As shown in FIG. 2, when the mechanical clutch 38 is further defined as a one-way clutch 40, hydraulic controls may be removed as they are no longer required to control the disconnect clutch 36 when the disconnect clutch 36 is further defined as the mechanical clutch 38, when compared to using a friction clutch. Removing the need for hydraulic controls decreases complexity of the torque transfer assembly 28 and allows better packaging of the one-way clutch 40 and the torque converter 34. However, it is to be appreciated that hydraulic controls may still be used for controlling the one-way clutch 40. Regardless of whether hydraulic controls are used to control the one-way clutch 40, the torque density of the one-way clutch 40 is higher than that of a friction clutch. When the mechanical clutch 38 is further defined as the one-way clutch 40, the one-way clutch 40 overruns when the internal combustion engine is off (i.e., not transferring rotational torque from the output shaft 24 to the transmission 26, which interrupts transfer of reverse torque from the transmission 26 to the output shaft 24 of the internal combustion engine 22). However, when the internal combustion engine 22 is on, the rotational torque transferred from the output shaft 24 causes the one-way clutch 40 to engage, which results in rotational torque being transferred from the output shaft 24 to the transmission 26. When the mechanical clutch 38 is further defined as the one-way clutch 40, the torque transfer assembly 28 is able to simultaneously deliver rotational torque to the transmission 26 from both the output shaft 24 and the electric machine 32, is able to solely deliver rotational torque to the transmission 26 from the output shaft 24, and is able solely to deliver rotational torque to the transmission 26 from the electric machine 32.

When the mechanical clutch 38 is further defined as the one-way clutch 40, the electric machine 32 can no longer start the internal combustion engine 22. In contrast, traditional torque transfer assemblies including the friction clutch as the disconnect clutch are able to start the internal combustion engine with the electric machine. In view of this, in embodiments where the disconnect clutch 36 is further defined as a one-way clutch 40, the engine starter 30 is used to start the internal combustion engine 22. As described below, examples of engine starters include a belt alternator starter, a permanently engaged starter, and the like.

Figure 3:
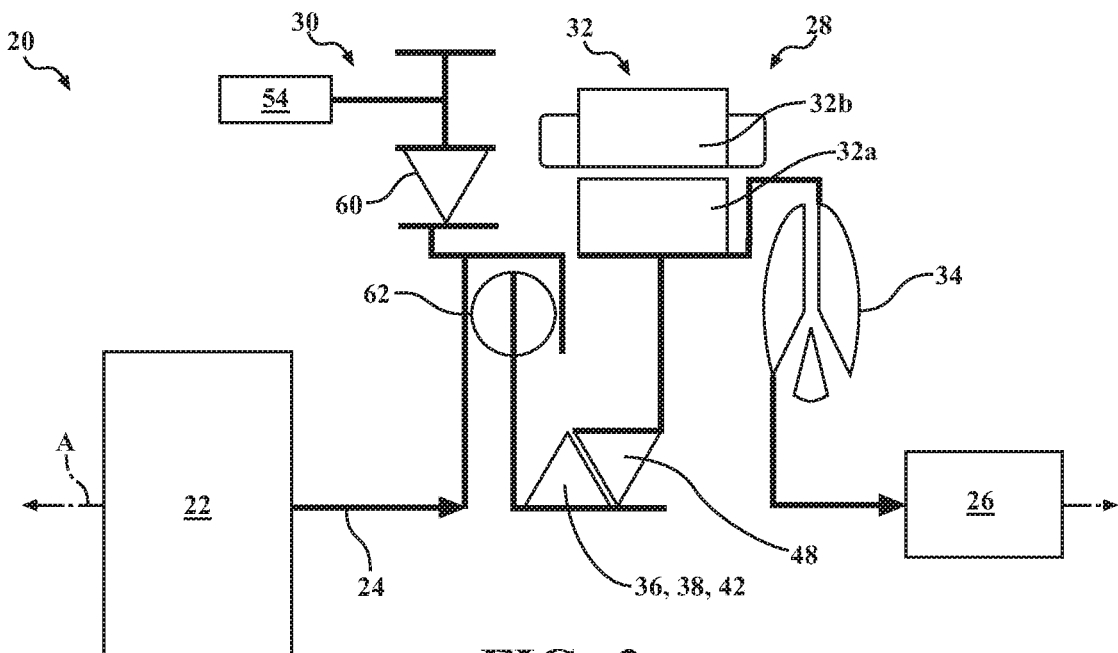
FIG. 3 is a schematic illustration of the torque transfer assembly of the vehicle, with the mechanical clutch being further defined as a selectable one-way clutch, and with the engine starter being further defined as a permanently engaged starter.

As shown in FIG. 3, when the mechanical clutch 38 is further defined as the selectable one-way clutch 42. As with the one-way clutch 40 described above, the selectable one-way clutch 42 does not need hydraulic controls to control the disconnect clutch 36 when the disconnect clutch 36 is further defined as the mechanical clutch 38, when compared to using a friction clutch. Again, giving the option to remove hydraulic controls decreases complexity of the torque transfer assembly 28 and allows better packaging of the selectable one-way clutch 42 and the torque converter 34. However, it is to be appreciated that hydraulic controls may still be used for controlling the selectable one-way clutch 42. Regardless of whether hydraulic controls are used to control the selectable one-way clutch 42, the torque density of the selectable one-way clutch 42 is higher than that of a friction clutch.

In contrast to embodiments where the one-way clutch 40 is used as the mechanical clutch 38, embodiments in which the selectable one-way clutch 42 is used as the mechanical clutch 38 allows the mechanical clutch 38 to free-wheel in both directions, and to transfer torque from the output shaft 24 to the transmission 26, and from the transmission 26 to the output shaft 24. In other words, the selectable one-way clutch 42 is not limited to solely transferring rotational torque from the output shaft 24 to the transmission 26. Specifically, the selectable one-way clutch 42 being used as the mechanical clutch 38 allows the internal combustion engine 22 to engine brake. In other words, the selectable one-way clutch 42 allows rotational torque to be delivered from the transmission 26 to the output shaft 24 such that the output shaft 24 of the internal combustion engine 22 receives the rotational torque and uses compression of the internal combustion engine 22 to that energy is dissipated. Allowing engine breaking can increase the lifespan of conventional friction-based systems of the vehicle 20. An example of a selectable one-way clutch is disclosed in PCT Publication No 2018/111957, published on Jun. 21, 2017, the disclosure of which is incorporated by reference in its entirety.

When the mechanical clutch 38 is further defined as the selectable one-way clutch 42, the torque transfer assembly 28 is able to simultaneously deliver rotational torque to the transmission 26 from both the output shaft 24 and the electric machine 32, is able to solely deliver rotational torque to the transmission 26 from the output shaft 24, is able solely to deliver rotational torque to the transmission 26 from the electric machine 32, and is able to solely deliver rotational torque from the transmission 26 to the output shaft 24. Additionally, the selectable one-way clutch 42 may also be used to start the internal combustion engine 22 with, for example, a traction motor when the vehicle 20 is stopped. When the mechanical clutch 38 is further defined as the selectable one-way clutch 42, the torque transfer assembly 28 may include an actuator 48 to selectively engage and disengage the selectable one-way clutch 42. An example of the selectable one-way clutch is a multi-mode clutch module, as disclosed in U.S. Pat. No. 9,726,236, issued on Aug. 8, 2017, the disclosure of which is incorporated by reference in its entirety.

Figure 4:
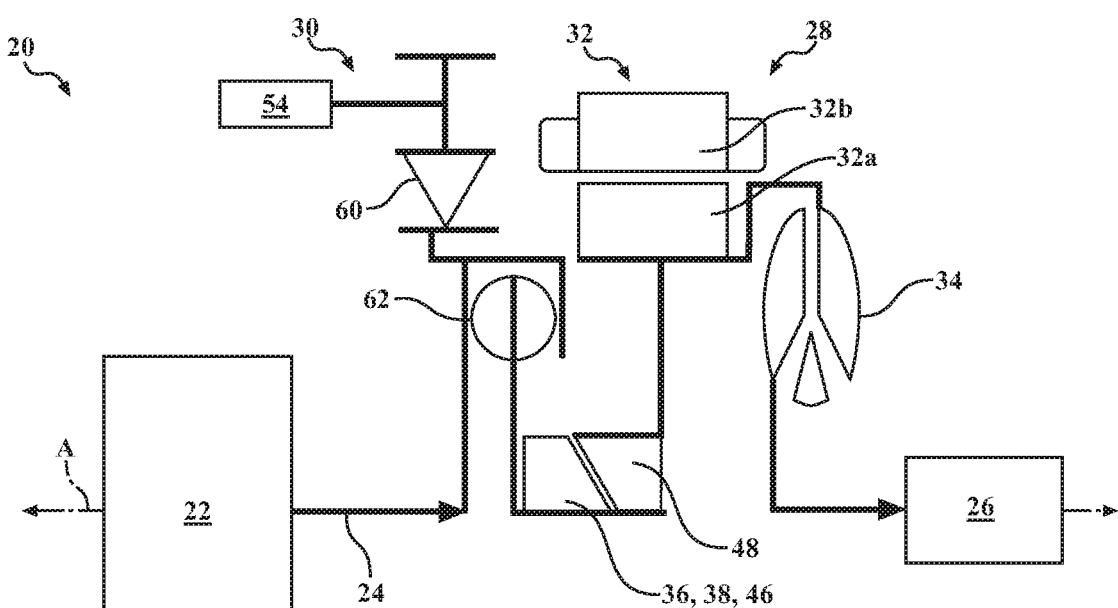
FIG. 4 is schematic illustration of the torque transfer assembly of the vehicle, with the mechanical clutch being further defined as a dog clutch, and with the engine starter being further defined as a permanently engaged starter.

As shown in FIG. 4, the mechanical clutch 38 is further defined as the dog clutch 46. To engage and disengage the dog clutch 46, the torque transfer assembly may also include the actuator 48. Unlike the one-way clutch 40, the dog clutch 46 only requires the engine starter 30 to start the internal combustion engine 22 when the vehicle 20 is moving (i.e., starting the internal combustion engine 22 on the fly). Similar to the selectable one-way clutch 42, the dog clutch 46 may also be used for engine braking.

Figure 5:
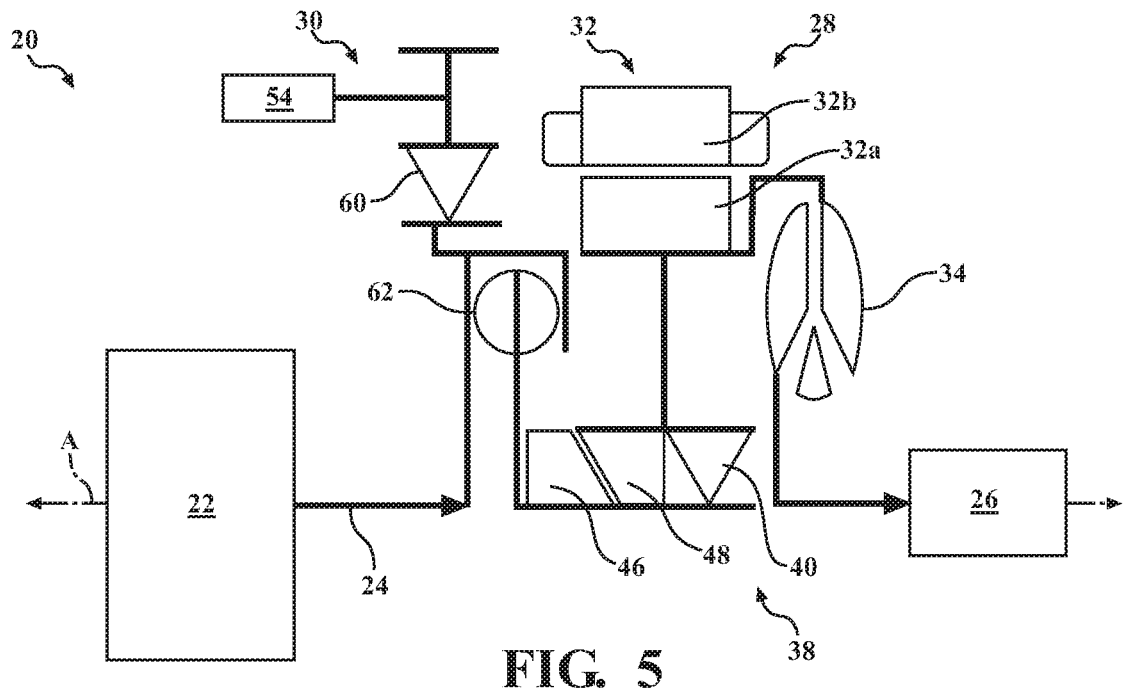
FIG. 5 is a schematic illustration of the torque transfer assembly of the vehicle, with the mechanical clutch being further defined as a dog clutch and a one-way clutch, and with the engine starter being further defined as a permanently engaged starter.

It is to be appreciated that the one-way clutch 40 and the dog clutch 46 may be used alone as the disconnect clutch 36 or may be used in combination with one another as the disconnect clutch 36. For example, as shown in FIG. 5, the torque transfer assembly 28 includes the one-way clutch 40 and the dog clutch 46. In such embodiments, the dog clutch 46 in combination with the one-way clutch 40 allows for a higher torque density and typically is more robust than a selectable one-way clutch.

Typically, the torque converter 34 extends along an axis A, with the electric machine 32 being disposed between the torque converter 34 and the mechanical clutch 38, as shown in FIG. 1. In such embodiments, the electric machine 32 may be referred to as a P2 module. In such embodiments, the location of the mechanical clutch 38 is the same as traditional disconnect clutches in traditional hybrid vehicles having an electric machine disposed between a transmission and an internal combustion engine. It is to be appreciated that the electric machine 32 may extend along a different axis that is parallel to axis A. In such embodiments, the electric machine 32 may be coupled to the torque converter 34 and the mechanical clutch 38 via a chain or gear train.

In addition to being adapted to selectively rotatably couple the output shaft 24 to the torque converter 34 for delivering rotational torque from the output shaft 24 to the transmission 26 through the torque converter 34, and adapted to selectively rotatably decouple the output shaft 24 from the torque converter 34 for allowing the electric machine 32 to deliver rotational torque to the transmission 26 through the torque converter 34, the mechanical clutch 38 may also be adapted to deliver rotational torque from the output shaft 24 and the electric machine 32 to the transmission 26. In such embodiments, the vehicle 20 may be referred to as a parallel hybrid vehicle as delivery of rotational torque may occur from the output shaft 24 to the transmission 26 and from the electric machine 32 to the transmission 26.

Figure 6:
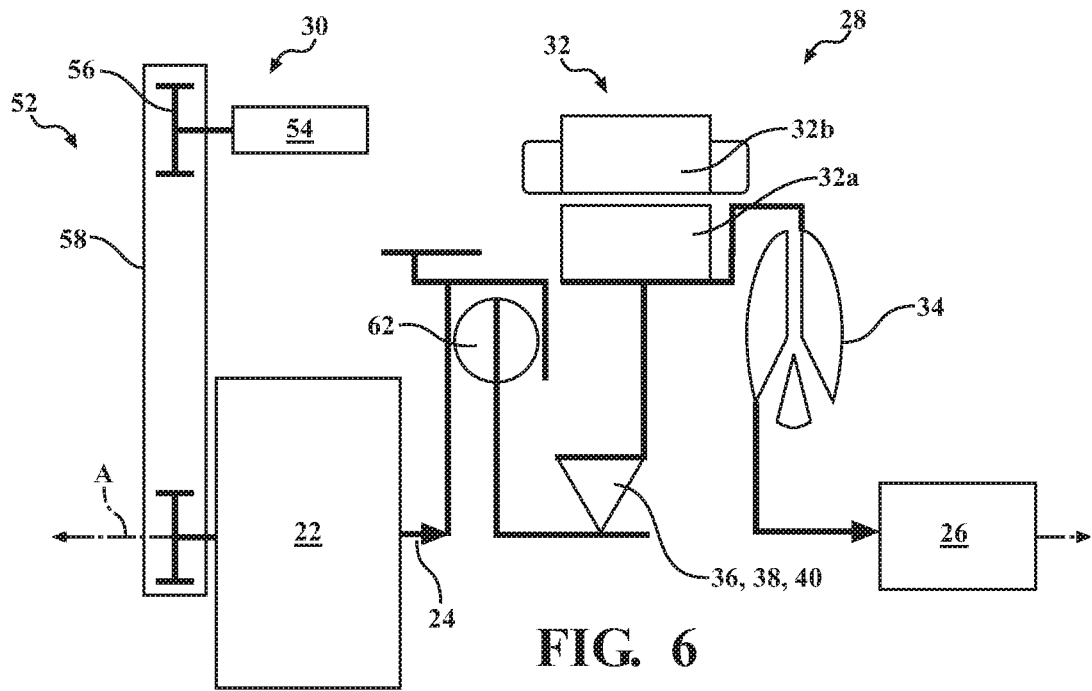
FIG. 6 is a schematic illustration of the torque transfer assembly of the vehicle, with the engine starter being further defined as a belt alternator starter.

In one embodiment, as shown in FIG. 6, the engine starter 30 may be further defined as a belt alternator starter 52. In such embodiments, the belt alternator starter 52 typically includes a starter motor 54, a drive pulley 56 rotatably coupled to the starter motor 54, and a belt 58 coupled to the drive pulley 56 for delivering rotational torque to the output shaft 24 for starting the internal combustion engine 22.

In another embodiment, as shown in FIGS. 1-5, 7, and 8, the engine starter 30 may be further defined as a permanently engaged starter 60. Although not shown in the FIGS, the permanently engaged starter 60 typically includes starter pinion meshingly engaged to a ring gear that is mounted to a flex plate or flywheel. An example of a permanently engaged starter is disclosed in U.S. Patent Application Publication No. 2018/00735681 filed on Sep. 13, 2016, the disclosure of which is incorporated by reference in its entirety.

It is to be appreciated that in FIGS. 1-6, that the engine starter 30 may be the permanently engaged starter 60 or the belt alternator starter 52. In other words, even though FIGS. 1-5 show the torque transfer assembly 28 including permanently engaged starter 60 with the one-way clutch 40 (FIG. 2), the selectable one-way clutch 42 (FIG. 3), the dog clutch 46 (FIG. 4), and the one-way clutch 40 and the dog clutch 46 (FIG. 5), it is to be appreciated that the belt alternator starter 52 may also be used with in FIGS. 1-5.

Figure 7:
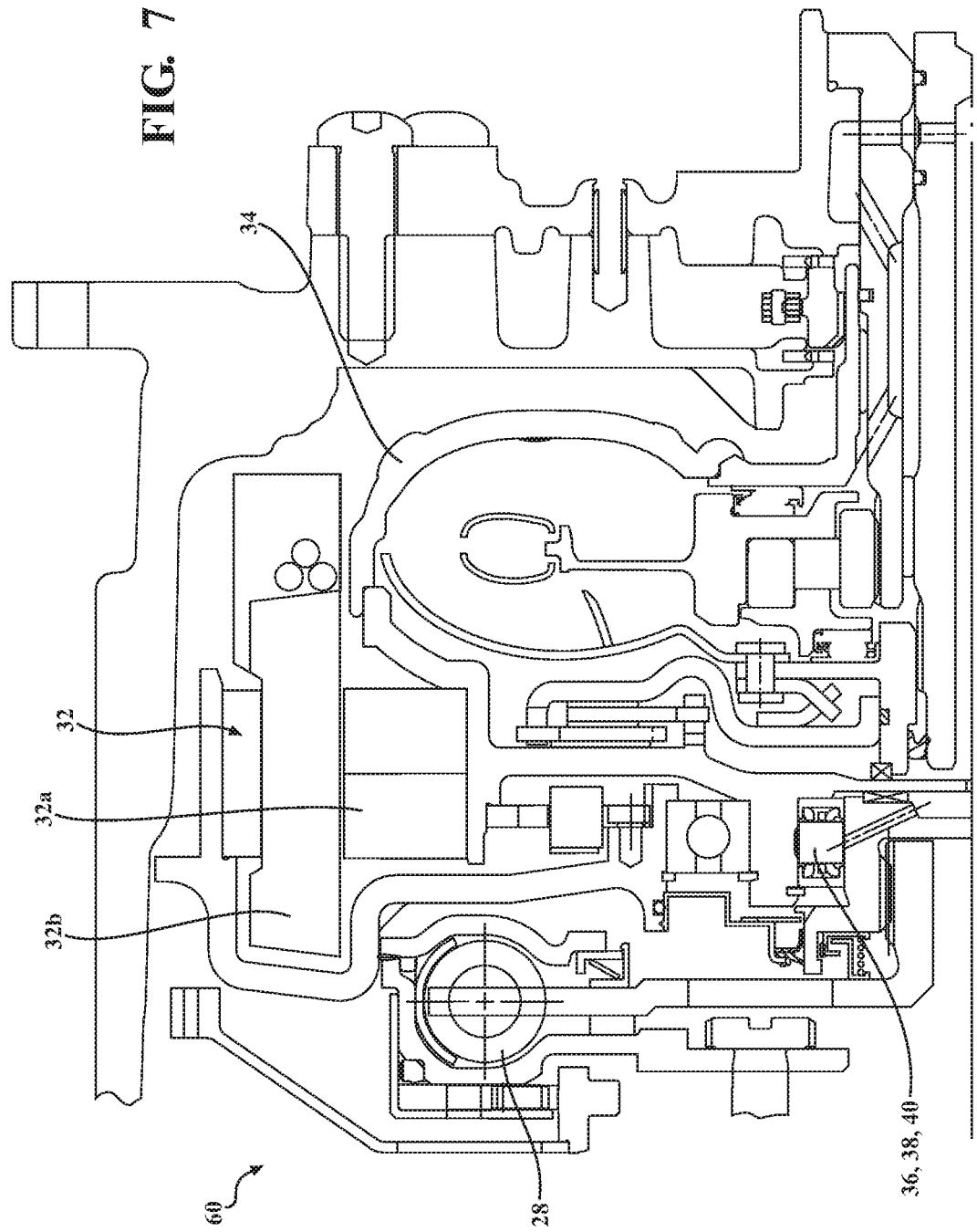
FIG. 7 is a cross-sectional view of the torque transfer assembly including the permanently engaged starter, the one-way clutch, the electric machine, and the torque converter.
Figure 8:
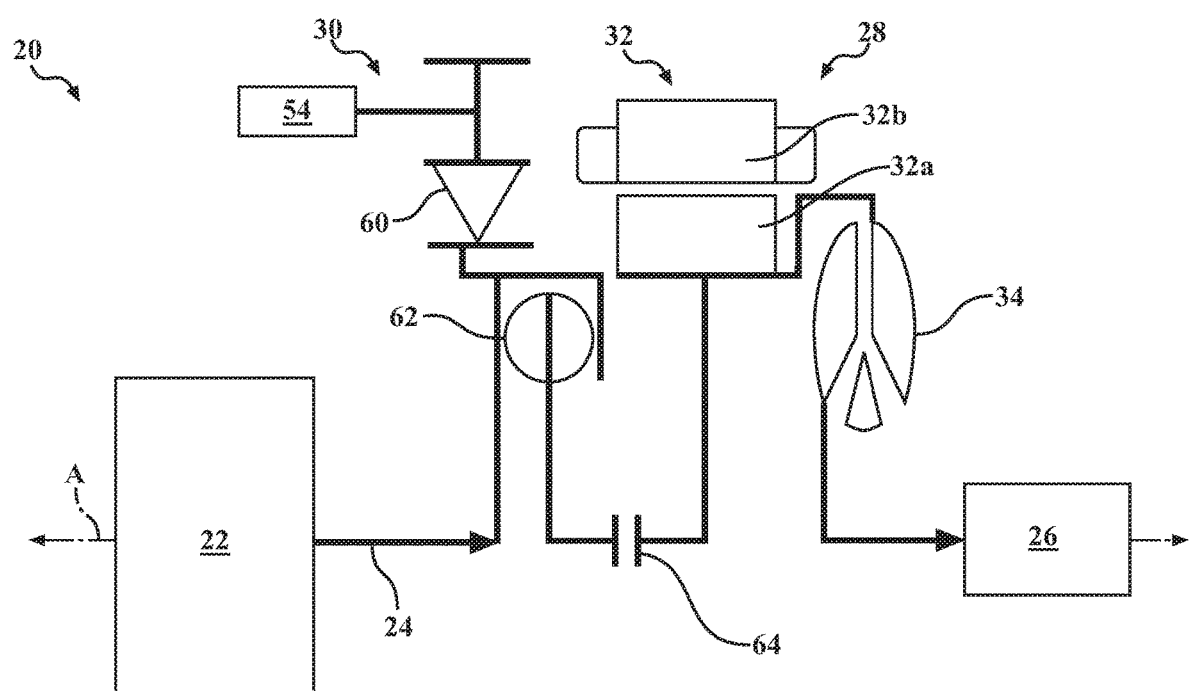
FIG. 8 is a schematic illustration of another embodiment of the torque transfer assembly of the vehicle, with the torque transfer assembly including an engine starter, an electric machine, a torque converter, and a friction clutch, and with the engine starter being further defined as a permanently engaged starter.

The torque transfer assembly 28 may include a damper 62 coupled to the output shaft 24. The damper 28 may be, but is not limited to, a harmonic damper, a centrifugal pendulum absorber, or a dual mass flywheel (for example, as shown in FIG. 7).

In one embodiment, the vehicle 20 includes the internal combustion engine 22 including an output shaft 24, such as a crankshaft. The vehicle 20 further includes the transmission 26 rotatably coupled to the output shaft 24 of the internal combustion engine 22 for transmitting rotational torque. The vehicle 20 includes another embodiment of the torque transfer assembly 28. In this embodiment, the torque transfer assembly 28 includes the permanently engaged starter 60 rotatably coupled to the output shaft 24 for rotating the output shaft 24 to start the internal combustion engine 22. The torque transfer assembly 28 also includes the electric machine 32 rotatably coupled to the transmission 26 for delivering rotational torque to the transmission 26. The torque transfer assembly 28 additionally includes the torque converter 34 rotatably coupled to the permanently engaged starter 60 and the transmission 26 for transferring rotational torque from the output shaft 24 to the transmission 26, from the output shaft 24 and the electric machine 32 to the transmission 26, or from the electric machine 32 to the transmission 26. The second torque transfer assembly 28 further includes the disconnect clutch 36. In this embodiment, the disconnect clutch is further defined as a friction clutch 64. The friction clutch 64 is rotatably coupled to the output shaft 24 and the torque converter 34. The friction clutch 64 is adapted to selectively rotatably couple the output shaft 24 to the torque converter 34 for delivering rotational torque from the output shaft 24 to the transmission 26 through the torque converter 34, and the friction clutch 64 is adapted to selectively rotatably decouple the output shaft 24 from the torque converter 34 for allowing the electric machine 32 to deliver rotational torque to the transmission 26 through the torque converter 34.

The torque transfer assembly including the permanently engaged starter 60, the electric machine 32, the torque converter 34, and the friction clutch 64 offers several advantages. First, the torque transfer assembly 28 allows the torque converter 34 to be used as the launching element, which allows the vehicle 20 to achieve torque multiplication when towing. Second, controlling the torque transferred through the torque converter 34 allows for simpler control strategies when compared to conventional torque transfer assemblies. Third, the torque converter 34 is more robust to thermal abuse when used as the launching element when compared to solely using the friction clutch 64 as the launch clutch. Fourth, the torque transfer assembly 28 including the friction clutch 64 and the torque converter 34 allows the starter motor 54 of the permanently engaged starter 60 to be smaller in size than traditional starter motors. For example, a power rating of the starter motor 54 of the permanently engaged starter 60 may be 45 KW or less, 40 KW or less, 35 KW or less, 30 KW or less, 25 KW or less, 20 KW or less, or 15 KW or less. Using the permanently engaged starter 60 with the friction clutch 64 removes the requirement of the electric machine 32 having a torque reserve for starting the internal combustion engine 22. In other words, all power of the electric machine 32 may be used for propelling the vehicle 20, rather than reserving a threshold level of power for starting the internal combustion engine 22, which improves fuel economy of the vehicle 20.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:
1. A vehicle comprising:
an internal combustion engine comprising an output shaft;
a transmission rotatably coupled to said output shaft of said internal combustion engine for transmitting rotational torque; and
a torque transfer assembly comprising,
    an engine starter rotatably coupled to said output shaft for rotating said output shaft to start said internal combustion engine,
    an electric machine rotatably coupled to said transmission for delivering rotational torque to said transmission,
    a torque converter rotatably coupled to said electric machine and said transmission for transferring rotational torque from at least one of said output shaft to said transmission, said output shaft and said electric machine to said transmission, and said electric machine to said transmission, and
    a disconnect clutch further defined as a mechanical clutch rotatably coupled to said output shaft and said torque converter, wherein said mechanical clutch is adapted to selectively rotatably couple said output shaft to said torque converter for delivering rotational torque from said output shaft to said transmission through said torque converter, and wherein said mechanical clutch is adapted to selectively rotatably decouple said output shaft from said torque converter for allowing said electric machine to deliver rotational torque to said transmission through said torque converter;

wherein said torque converter extends along an axis, and wherein said electric machine is disposed between said torque converter and said mechanical clutch.

2. The vehicle as set forth in claim 1, wherein said engine starter is further defined as a belt alternator starter.

3. The vehicle as set forth in claim 2, wherein said engine starter comprises a starter motor, a drive pulley rotatably coupled to said starter motor, and a belt coupled to said drive pulley for delivering rotational torque to said output shaft for starting said internal combustion engine.

4. The vehicle as set forth in claim 1, wherein said engine starter is further defined as a permanently engaged starter.

5. The vehicle as set forth in claim 1, wherein said mechanical clutch is adapted to deliver rotational torque from said output shaft and said electric machine to said transmission.

6. The vehicle as set forth in claim 1, wherein said mechanical clutch is further defined as at least one of a one-way clutch, a selectable one-way clutch, and a dog clutch.

7. The vehicle as set forth in claim 6, wherein said mechanical clutch is said dog clutch, and wherein said torque transfer assembly further comprises an actuator for selectively engaging and disengaging said dog clutch.

8. A torque transfer assembly for use in a vehicle, with the vehicle including an internal combustion engine including an output shaft, and a transmission adapted to be rotatably coupled to the output shaft for transmitting rotational torque via said torque transfer assembly, said torque transfer assembly comprising:

an engine starter adapted to be rotatably coupled to the output shaft for rotating the output shaft to start the internal combustion engine;

an electric machine adapted to be rotatably coupled to the transmission for delivering rotational torque to the transmission;

a torque converter rotatably coupled to said electric machine and adapted to be rotatably coupled to the transmission; and a disconnect clutch further defined as a mechanical clutch adapted to be rotatably coupled to the output shaft and said torque converter, wherein said mechanical clutch is adapted to selectively rotatably couple the output shaft to the torque converter for delivering rotational torque from the output shaft to the transmission through said torque converter, and wherein said mechanical clutch is adapted to selectively rotatably decouple the output shaft from the torque converter for allowing said electric machine to deliver rotational torque to the transmission through said torque converter;

wherein said torque converter extends along an axis, and wherein said electric machine is disposed between said torque converter and said mechanical clutch.

9. The torque transfer assembly as set forth in claim 8, wherein said engine starter is further defined as a belt alternator starter.

10. The torque transfer assembly as set forth in claim 9, wherein said engine starter comprises a starter motor, a drive pulley rotatably coupled to said starter motor, and a belt coupled to said drive pulley and adapted to deliver rotational torque to the output shaft for starting the internal combustion engine.

11. The torque transfer assembly as set forth in claim 8, wherein said engine starter is further defined as a permanently engaged starter.

12. The torque transfer assembly as set forth in claim 8, wherein said mechanical clutch is adapted to deliver rotational torque from the output shaft and said electric machine to the transmission.

13. The torque transfer assembly as set forth in claim 8, wherein said mechanical clutch is further defined as at least one of a one-way clutch, a selectable one-way clutch, and a dog clutch.

14. The torque transfer assembly as set forth in claim 13, wherein said mechanical clutch is said dog clutch, and wherein said torque transfer assembly further comprises an actuator for selectively engaging and disengaging said dog clutch.

15. A vehicle comprising:

an internal combustion engine comprising an output shaft;

a transmission rotatably coupled to said output shaft of said internal combustion engine for transmitting rotational torque; and a torque transfer assembly comprising, a permanently engaged starter rotatably coupled to said output shaft for rotating said output shaft to start said internal combustion engine, an electric machine rotatably coupled to said transmission for delivering rotational torque to said transmission, a torque converter rotatably coupled to said electric machine and said transmission for transferring rotational torque from said output shaft to said transmission, from said output shaft and said electric machine to said transmission, or from said electric machine to said transmission, and a friction clutch rotatably coupled to said output shaft and said torque converter, wherein said friction clutch is adapted to selectively rotatably couple said output shaft to said torque converter for delivering rotational torque from said output shaft to said transmission through said torque converter, and wherein said friction clutch is adapted to selectively rotatably decouple said output shaft from said torque converter for allowing said electric machine to deliver rotational torque to said transmission through said torque converter;

wherein said torque converter extends along an axis, and wherein said electric machine is disposed between said torque converter and said friction clutch.

16. The vehicle as set forth in claim 15, wherein said permanently engaged starter comprises a starter motor having a power rating of 45 KW or less.

17. A torque transfer assembly for use in a vehicle, with the vehicle including an internal combustion engine including an output shaft, and a transmission adapted to be rotatably coupled to the output shaft for transmitting rotational torque via said torque transfer assembly, said torque transfer assembly comprising a permanently engaged starter adapted to be rotatably coupled to said output shaft for rotating said output shaft to start said internal combustion engine, an electric machine adapted to be rotatably coupled to said transmission for delivering rotational torque to said transmission, a torque converter rotatably coupled to said electric machine and adapted to be rotatably coupled to said transmission, and a disconnect clutch further defined as a friction clutch adapted to be rotatably coupled to said output shaft and said torque converter, wherein said friction clutch is adapted to selectively rotatably couple said output shaft to said torque converter for delivering rotational torque from said output shaft to said transmission through said torque converter, and wherein said friction clutch is adapted to selectively rotatably decouple said output shaft from said torque converter for allowing said electric machine to deliver rotational torque to said transmission through said torque converter;

wherein said torque converter extends along an axis, and wherein said electric machine is disposed between said torque converter and said friction clutch.

18. The torque transfer assembly as set forth in claim 17, wherein said permanently engaged starter comprises a starter motor having a power rating of 45 KW or less.

* * * * *